118-405
3/31/87

United States Patent [19]
Nagai et al.

[11] E Patent Number: Re. 32,385
[45] Reissued Date of Patent: Mar. 31, 1987

[54] APPARATUS FOR THE MANUFACTURE OF A COMPOSITE METAL WIRE

[75] Inventors: Masahiro Nagai; Yasuhiko Miyake, both of Hitachi, Japan

[73] Assignee: Hitachi Cable, Ltd., Tokyo, Japan

[21] Appl. No.: 806,798

[22] Filed: Dec. 9, 1985

Related U.S. Patent Documents

Reissue of:
[64] Patent No.: 4,217,852
Issued: Aug. 19, 1980
Appl. No.: 966,042
Filed: Dec. 4, 1978

U.S. Applications:
[62] Division of Ser. No. 899,968, Apr. 25, 1978.

[30] Foreign Application Priority Data

Apr. 30, 1977 [JP] Japan ..... 52-50073
Apr. 30, 1977 [JP] Japan ..... 52-50076

[51] Int. Cl.[4] ..... B05C 3/12
[52] U.S. Cl. ..... 118/405; 72/258; 72/262; 427/11; 427/191; 427/192; 427/434.7
[58] Field of Search ..... 427/11, 191, 192, 431, 427/434.7; 118/405; 72/258, 262

[56] References Cited

U.S. PATENT DOCUMENTS 2,931,082 5/1960 Brennan ..... 164/461
3,646,796 3/1972 Tanaka et al. ..... 72/258
3,765,216 10/1973 Green ..... 72/262
3,914,481 10/1975 Bostroem ..... 427/434.7
3,941,182 3/1976 Bjorkstren et al. ..... 164/461
4,277,968 7/1981 Pardoe ..... 72/262

FOREIGN PATENT DOCUMENTS 1277313 10/1961 France .
51-26319 8/1976 Japan .

*Primary Examiner*—Sadie L. Childs
*Attorney, Agent, or Firm*—Wenderoth, Lind & Ponack

[57] ABSTRACT

Apparatus for manufacturing a composite metal wire including a core metal wire having extruded therearound a coating metal layer which is different in material from the core metal wire. The coating metal is fed into a narrow passageway which is defined between a circumferential groove formed on the outer edge of a rotary wheel and a close fitting surface of a fixed shoe block, the cross-sectional area therebetween decreasing for half the distance between entry and discharge and thereafter increasing until discharge. The coating metal is carried towards an outlet end of the passageway by frictional drag with the surface of the passageway in accordance with the rotation of the wheel. A core metal wire harder in material than the coating metal is passed through a covering chamber of a larger cross sectional area which is provided with a die and a nipple at the front and rear portions respectively, whereby the core metal drive is covered with the coating metal in the covering chamber so that a predetermined construction of the composite metal wire is extruded through the die.

5 Claims, 5 Drawing Figures

APPARATUS FOR THE MANUFACTURE OF A COMPOSITE METAL WIRE

Matter enclosed in heavy brackets [ ] appears in the original patent but forms no part of this reissue specification; matter printed in italics indicates the additions made by reissue.

This is a Division of application Ser. No. 899,968, filed Apr. 25, 1978.

BACKGROUND OF THE INVENTION

This invention relates to an apparatus for the manufacture of a composite metal wire including a core metal wire having extruded therearound a coating metal layer which is different in material from the core metal wire.

Conventionally, a composite metal wire has been manufactured according to methods well known to those skilled in the art and put into a practical use for many purposes. In one of the typical methods, a composite metal wire is manufactured with use of composite billets. Such a billet has a construction of an inner core metal and an outer coating metal which are concentrically positioned. In another method, a composite metal wire is manufactured with the extrusion of a coating metal around a running core wire. In the former method wherein the composite billet is used, an extruder or a rolling apparatus has been adopted.

In such a method of manufacturing a composite metal wire, it is desirable that a composite metal wire be continuously manufactured in an infinite length and that a uniform quality is obtained along the entire length thereof.

In a method of using a composite billet, however, such a billet proves itself a limitation with regard to the volume thereof so that it is definitely impossible to manufacture a composite metal wire of an infinite length. For this reason, a predetermined number of the composite billets must be connected one after another in every stroke of the extrusion operation to provide a desired length of the composite metal wire. However, such a connection of composite billets is extremely difficult during the manufacture thereof. Accordingly, the manufacturing operation is interrupted by this connection of composite billets. This results in a lower productivity in the manufacture of a composite metal wire. Further, even if a composite metal wire of an infinite length can be manufactured in the method as set forth above, it has been considered extremely difficult to provide a composite metal wire with a uniform quality along the entire length thereof.

On the other hand, the coating metal also proves itself a limitation with regard to the volume thereof even in a method of extruding a coating metal layer on a core wire although the core wire is easily available in an infinite length. Accordingly, it is absolutely required that the coating metal be recharged into an extruder during every stroke of the extrusion operation to provide a composite metal wire with such a length. However, a lower productivity also results from the interruption of the manufacturing operation in accordance with the recharging process thereof. In this method, especially, the so-called "stop-mark" is often observed on the products as an indication of why it is difficult to uniformly control the condition of extruding a coating metal layer by different extrusion strokes.

As explained above, the disadvantages in the methods of using a composite billet and of extruding a coating metal layer are that it is impossible to continuously manufacture a composite metal wire and irregularities on the material used are found longitudinally on the products. Especially, it has been regarded as a great problem that such irregularities are produced due to the above mentioned reason during the manufacture of an electrical conducting wire such as an aluminium-clad steel wire (aluminium coated steel wire)

BRIEF SUMMARY OF THE INVENTION

Accordingly, it is an object of the present invention to provide an apparatus for the manufacture of a composite metal wire wherein there is no limitation on the length and volume of materials to be used for the core metal and the coating metal.

It is another object of the present invention to provide an apparatus for the manufacture of a composite metal wire wherein the extrusion of a coating metal layer can be continuously made without any limitation along the entire length thereof.

It is a further object of the present invention to provide an apparatus for the manufacture of a composite metal wire wherein the productivity thereof is remarkable improved as a result of the continuous manufacturing operation.

It is a still further object of the present invention to provide an apparatus for the manufacture of a composite metal wire whereby there is obtained a composite metal wire having an uniform quality along the entire length thereof.

According to one aspect of the present invention, there is provided an improved apparatus for manufacturing a composite metal wire including a core metal wire having extruded therearound a coating metal layer which is different in material from the core metal wire. The coating metal is fed into a narrow passageway, the narrow passageway being defined between a rotary wheel and a fixed shoe block, the rotary wheel having a circumferential groove around the outer edge thereof and the fixed shoe block making a close fit to the circumferential groove of the wheel. The coating metal is carried toward an outlet end of the passageway therealong by frictional drag with the surface of the passageway as part or the whole of the pressure of extrusion. The core metal wire of a material harder than the coating metal is passed through a covering chamber positioned at the outlet end of the narrow passageway, the covering chamber having a die and a nipple at the front and rear portions thereof, respectively. The core metal wire is covered with the coating metal in the covering chamber to establish a bonding between the two metals, whereby a predetermined construction of a composite metal wire is extruded through the die.

According to the present invention, there is provided an improved apparatus for manufacturing a composite metal wire having such a construction as set forth above. The improved apparatus comprises a rotary wheel having a circumferential groove on the outer edge thereof, a fixed shoe block making a close fit to the rotary wheel, the rotary wheel and the fixed shoe block cooperatively defining a narrow passageway between the circumferential groove of the former and a fitting surface of the latter for feeding a coating metal thereinto, and a covering chamber having a wider cross sectional area positioned at the back or outlet end of the narrow passageway, the covering chamber being provided with a die and a nipple at the front and rear portions thereof, respectively, whereby the extrusion of a composite metal wire is effected by frictional drag of the coating metal with the surface of the circumferential groove as a part or the whole of the pressure of extrusion.

According to the present invention, the core metal wire is of harder material than the coating metal in the construction of a composite metal wire. For instance, metals such as steel, copper, aluminium or alloys thereof may be used as materials of the core metal wire.

On the other hand, the coating metal must have less deformation resistance than the core metal wire. For instance, metals such as zinc, lead, tin or alloys thereof, other than the above mentioned metals, may be used as materials of the coating metal in the combination of two metals as set forth above. In addition, a coating metal may be fed in the form of a wire member, powdery metal or liquid metal in accordance with a specified manufacturing condition of the composite metal wire.

According further to the present invention, the following composite metal wires can be effectively manufactured, that is, for instance, aluminium-clad steel wire (aluminium coated steel wire), aluminium-clad copper wire (aluminium coated copper wire), copper-clad steel wire (copper coated steel wire), lead-clad steel wire (lead coated steel wire), lead-clad aluminium wire (lead coated aluminium wire) etc.

Other objects and aspects of the invention will become apparent from the following description of preferred embodiments with reference to the accompanying drawings in which:

DESCRIPTION OF THE PREFERRED EMBODIMENTS

Figure 1:
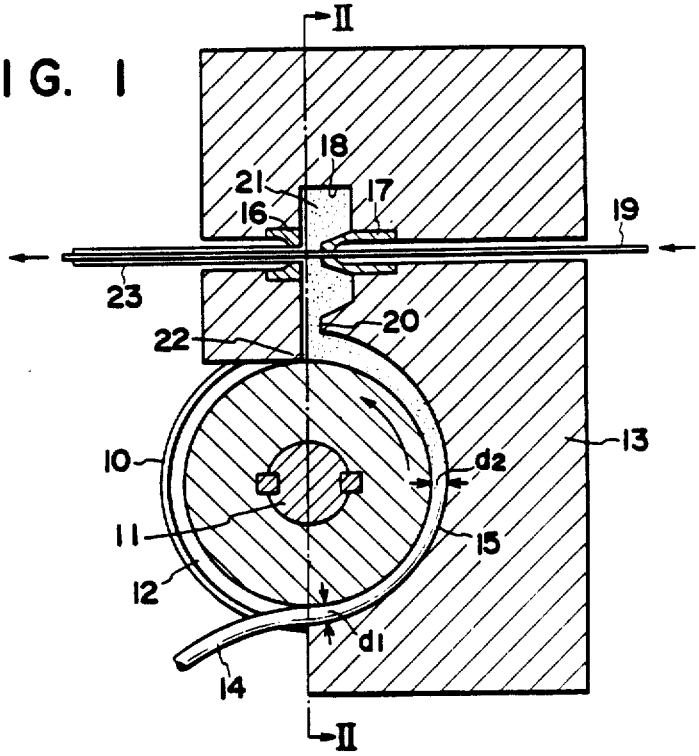
FIG. 1 is a sectional view illustrating apparatus for manufacturing a composite metal wire according to the present invention.
Figure 2:
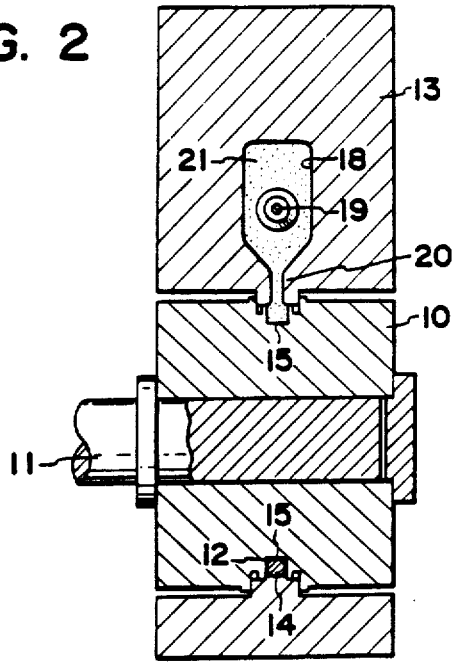
FIG. 2 is a sectional view taken along the line II—II of FIG. 1.

With reference to FIGS. 1 and 2, there is shown apparatus for manufacturing a composite metal wire according to the present invention. A rotary wheel 10 is provided on an outer edge thereof with a circumferential groove 12 having an approximately U shaped cross section. The rotary wheel 10 is mounted on a drive shaft 11 to allow the rotation thereof in a predetermined direction. A shoe block 13 is fixed to a base (not shown) so as to maintain a close fit to the rotary wheel 10. A norrow passageway 15 for feeding an aluminium bar 14 thereinto is defined between the circumferential groove 12 of the rotary wheel 10 and a cooperating fitting surface of the fixed shoe block 13. This passageway 15 is considered to have a container-like function for the aluminium bar 14 and is shaped as having a cross sectional area which decreases for the first half length and which then increases therefrom to the back or outlet end thereof as illustrated by $d_1$ and $d_2$, respectively designating large and small portions of the cross sectional area in FIG. 1.

A covering room or chamber 18 is provided in block 13 at a position orthogonal to the outlet end of the passageway 15 and is provided with a die 16 and a nipple 17 at the front and rear portions respectively. A steel wire 19 is introduced as a core metal wire through the nipple 17, the chamber 18 and the die 16. A stopper 22 is positioned at the end of the passageway 15 to close the same, and a portion 20 having a decreased cross sectional area is installed right above the stopper 22 to connect passageway 15 and chamber 18. *As shown in the drawings, the cross sectional area of portion 20 is less than the cross sectional areas of chamber 18 and passageway 15.*

The cross sectional area of the covering chamber 18 is designed to be larger than that of the passageway 15 and that of the decreased area portion 20. The presence of the covering chamber 18 having a larger area and the decreased area portion 20 allows the pressure of extrusion necessary for the manufacture of a composite metal wire to remain stable during the manufacturing operation as set forth in detail hereinafter.

The stopper 22 is adapted to close the end of the passageway 15 by the tight combination thereof with the groove 12.

In operation, the extrusion of a composite metal wire is effected with the rotation of the wheel 10 in the direction of the arrow and the feeding of the aluminium bar 14 into the passageway 15. The aluminium bar 14 is subjected to contacting frictional resistance against the groove 12 as the rotary wheel 10 rotates so that the aluminium bar 14 is carried by frictional drag towards the back of the passageway 15. The bar 14 is thus plastically deformed and passes toward chamber 18 as fluid aluminium. The fluid aluminium 21 surrounds the steel wire 19 in the chamber 18 so that an aluminium-clad steel wire 22 is extruded through the die 16 of the extruder.

Figure 3:
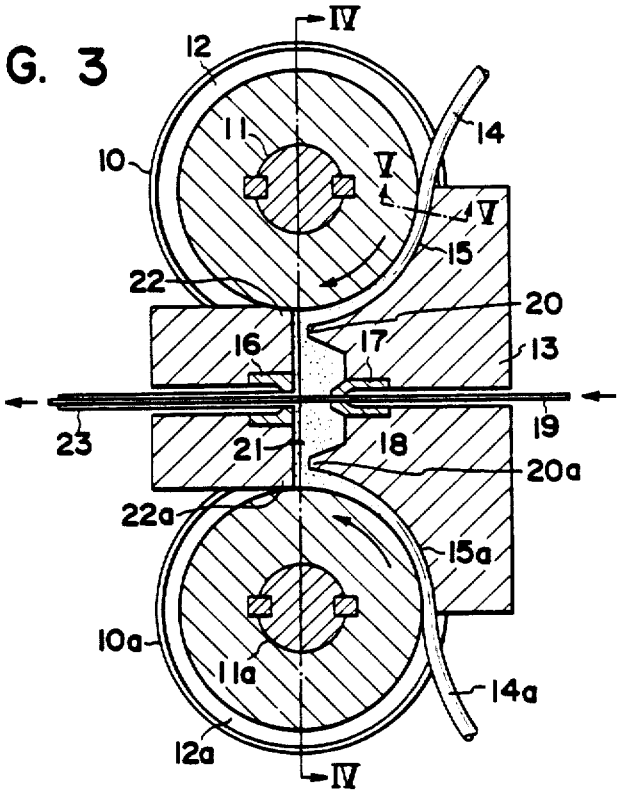
FIG. 3 is a sectional view illustrating apparatus for manufacturing a composite metal wire in another manner embodying the present invention.
Figure 4:
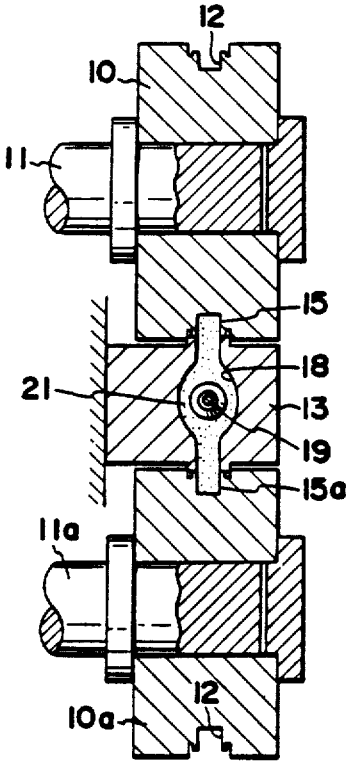
FIG. 4 is a sectional view taken along the line IV—IV of FIG. 3.
Figure 5:
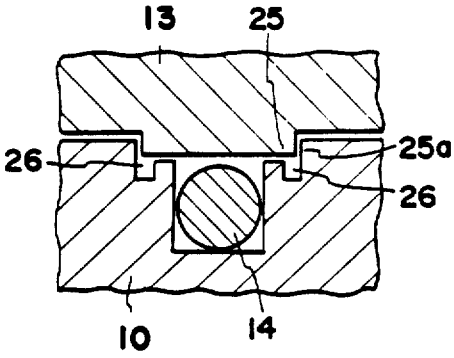
FIG. 5 is a sectional view taken along the line V—V of FIG. 3.

With reference next to FIGS. 3 to 5, there is shown apparatus entitled a "two wheel system" for manufacturing a composite metal wire according to another embodiment of the present invention.

Two rotary wheels 10 and 10a are symmetrically mounted on drive shafts 11 and 11a, respectively. The rotary wheels 10 and 10a are provided on the outer edges thereof with circumferential grooves 12 and 12a having U-shaped cross sections respectively. A common shoe block 13 is fixed to a base (not shown) so as to maintain a close fit to the rotary wheels 10 and 10a. Narrow passageways 15 and 15a are defined for feeding aluminium bars 14 and 14a thereinto between the circumferential grooves 12 and 12a of the rotary wheels 10 and 10a and the fitting surfaces of the fixed shoe block 13, respectively.

Each of the passageways 15 and 15a is shaped as having a cross sectional area which decreases for a first half length portion and which increases therefrom to the outlet end thereof, as fully explained in the former embodiment.

A covering room or chamber 18 is installed in block 13 at a position orthogonal to the respective outlet ends of the passageways 15 and 15a and is provided with a die 16 and a nipple 17 at the front and rear portions thereof, respectively. A steel wire 19 is introduced into the covering chamber 18. Stoppers 22 and 22a are positioned to close the respective ends of the passageways 15 and 15a.

In the two wheel system of this embodiment according to the present invention, each of the aluminium bars 14 and 14a is 8 mm in diameter and the steel wire 19 is 2.6 mm in diameter.

The driving force of each of the rotary wheels 10 and 10a is 30 HP, and the speed of revolution thereof is 10 r.p.m. The configuration of the circumferential grooves 12 and 12a is 8 mm square, so that the cross sectional area thereof is 64 $mm^2$. Further, the cross sectional area of the covering chamber 18 is 200 $mm^2$, while that of decreased area portions 20 and 20a is 50 $mm^2$.

The aluminium bars 14 and 14a are fed into the passageways 15 and 15a respectively after being subjected to a preliminary heating up to 300°–450° C. The extrusion of a composite metal wire is effected by the pressure of extrusion of 15–40 $kg/mm^2$ in the covering chamber 18. The steel wire 19 is preliminarily heated up to 250°–350° C. and is subjected to a forward traction force of 150–300 kg for the extrusion of the composite metal wire.

In the case of manufacturing an aluminium-clad steel wire 23, the speed of extrusion is 150 m/min. The outer diameter of the aluminium-clad steel wire 23 is 3.2 mm while the thickness of the coating aluminium is 0.3 mm. As set forth above, the cross sectional area of the covering chamber 18 is larger than that of the passageways 15 and 15a.

This allows a sufficient quantity of the fluid aluminium contained in the covering chamber 18 to accomodate a minute fluctuation of the pressure of extrusion by the viscosity thereof even if such a fluctuation occurs for the aluminium bars 14 and 14a in the passageways 15 and 15a. Accordingly, the pressure of extrusion is always kept stable when the coating aluminium 21 is metallurgically bonded to the steel wire 19. The decreased area portions 20 and 20a are positioned between the covering chamber 18 and the passageways 15 and 15a, respectively. This prevents the fluid aluminium 21 from reversely flowing into the passageways 15 and 15a when the pressure of extrusion is extremely decreased due to any fluctuation of the contacting frictional resistance (frictional drag) in the passageways 15 and 15a. Accordingly, both the covering chamber 18 of a larger cross sectional area and the decreased area portions 20 and 20a serve the purpose of stabilizing the pressure of extrusion. The block 13 is provided with a fitting step portion 25, while the rotary wheel 10 is provided with two fitting step portions 25a at opposite sides of the groove 12 as shown in FIG. 5. Accordingly, the rotary wheel 10 faces the fixed shoe block 13 with more than two fitting surfaces. Further, the wheels 10 and 10a are each provided with a pair of shallow grooves 26 between the two fitting surfaces so that splinters of a coating metal 14 are easily set free even if they are produced.

Although the occurrence of such splinters can be decreased to some extent by the close fit of the step portions 25 and 25a, it is very difficult to perfectly prevent the occurrence of splinters. The shallow grooves 26 serve the purpose of suppressing the growth of such splinters due to the fact that the increase of pressure is avoided with the release thereof into the shallow grooves 26. Especially, it is ascertained that the occurrence of splinters is remarkable near the areas of the stoppers 22 and 22a. However, splinters of a material to be carried can be easily set free because the stoppers 22 and 22a are designed to have side surfaces fitting into the grooves 12 and 12a which are provided with freeing surfaces.

As set forth above, the various means are adapted to suppress the disadvantage of splinters so that no difficulty will result even in the event of the occurrence of splinters in this embodiment according to the present invention. Further, such means for coping with the problem of splinters results in less overall consumption of power. Accordingly, this makes a big contribution to the practical use of the present invention.

The change of cross sectional area of the passageways 15 and 15a serves the purpose of not only producing the frictional drag necessary for the pressure of extrusion but also of decreasing the frictional drag which is the cause of the consumption of power.

There is expected the following advantages in the above mentioned embodiment of the two wheel system with regard to the manufacture of a composite metal wire as compared to the former embodiment of a single wheel system.

One advantage is that less power is necessary to drive the rotary wheels 10 and 10a, and the ratio of extrusion can be larger so that the thickness of an extruded coating metal can be freely changed within a broader range.

Another advantage is that the flows of extruded coating metal are well balanced dynamically at the opposite entrances to the covering chamber 18 so that uniformity is surely obtained in the bonding between a core metal, wire and a coating metal, and uneven thickness of the coating metal layer hardly occurs. Further, the apparatus of the two wheel system is stable mechanically and dynamically, thus providing less possibility of breakdown and an excellent durability.

It goes without saying that it is possible to increase the number of rotary wheels other than the two wheel system in the present invention. For instance, it is considered a practical use that three wheels may be installed at angles of 120 degrees and four wheels may be installed at angles of 90 degrees.

As fully explained in the above mentioned embodiments, there is no limitation on the length and volume for materials of the core metal, and a coating metal and the manufacture of a composite metal wire can be continuously performed in an infinite length thereof so that the productivity thereof is remarkably improved and an excellent product can be obtained without any irregularity of materials.

Further, the apparatus of the present invention may be extremely small as compared to the volume of a conventional apparatus of a press-extruding system having a larger container.

Although the invention has been described in preferred embodiments with a certain degree of particularity, it is understood that the present disclosure of the preferred embodiments may be changed with regard to the details of construction and the combination and arrangement of parts without departing from the spirit and the scope of the invention as hereinafter claimed.

What we claim is:

1. An apparatus for manufacturing a composite metal wire including a metal core wire surrounded by a coating metal of a material different from said metal core wire, said apparatus comprising:

a rotary wheel having therein a peripheral groove;

a fixed shoe block having a fitting surface cooperating with a circumferential portion of said groove to define therewith a narrow passageway having an inlet end and an outlet end;

a fixed stopper portion fitting in said groove to entirely close said passageway and to define said outlet end thereof;

a covering chamber communicating with said outlet end of said passageway;

a nipple leading into said covering chamber for guiding thereinto a metal core wire;

a die leading from said covering chamber for defining the outer cross section of a composite metal wire;

whereby feeding of coating metal into said inlet end of said passageway, while rotating said rotary wheel in a direction toward said outlet end of said passageway, subjects said coating metal within said passageway to plastic deformation due to oppositely directed forces including a greater friction force from the surfaces of said wheels defining said groove and a lesser friction force from said fitting surface of said fixed shoe block, and positively carries said coating metal through said passageway by said greater friction force and causes said coating metal to collide with said fixed stopper portion, thereby imparting to said coating metal an extrusion pressure which causes said coating metal to pass into and fill said covering chamber; [and]

*the cross sectional area of said chamber being greater than the cross sectional area of said passageway to*

*ensure that said extruding pressure remains stable in said chamber; and* whereby passing of a metal core wire into said nipple through said covering chamber causes said metal core wire to be covered by said coating metal to form a bond therebetween and, due to said extrusion pressure, causes a composite metal wire formed by said metal core wire covered with said coating metal to be extruded through said die.

2. An apparatus as claimed in claim 1, comprising two said rotary wheels defining with said fixed shoe block two said passageways.

3. An apparatus as claimed in claim 1, wherein said passageway has a cross-sectional area which decreases for a first half length portion from said inlet end and which then increases to said outlet end.

*4. An apparatus as claimed in claim 1, wherein said passageway is connected to said chamber by a decreased area portion having a cross sectional area smaller than said cross sectional area of said passageway, thereby forming means for preventing said coating metal from flowing from said chamber to said passage.*

*5. An apparatus as claimed in claim 1, wherein said passageway is connected to said chamber by a decreased area portion having a cross sectional area smaller than said cross sectional area of said chamber, thereby forming means for preventing said coating metal from flowing from said chamber to said passage.*

* * * * *